United States Patent
Sengodan et al.

(10) Patent No.: US 10,187,454 B2
(45) Date of Patent: Jan. 22, 2019

(54) SYSTEM AND METHOD FOR DYNAMIC CLUSTERED JMS IN AN APPLICATION SERVER ENVIRONMENT

(71) Applicant: ORACLE INTERNATIONAL CORPORATION, Redwood Shores, CA (US)

(72) Inventors: Kathiravan Sengodan, Alpharetta, GA (US); Linda K. Schneider, San Jose, CA (US); Salvatore Anthony Gambino, Ringoes, NJ (US); Thomas E. Barnes, Whitehouse, NJ (US); Rajesh Patel, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 178 days.

(21) Appl. No.: 14/865,748

(22) Filed: Sep. 25, 2015

(65) Prior Publication Data
US 2016/0094625 A1  Mar. 31, 2016

Related U.S. Application Data

(60) Provisional application No. 62/056,428, filed on Sep. 26, 2014.

(51) Int. Cl.
*H04L 29/08* (2006.01)
*H04L 12/58* (2006.01)

(52) U.S. Cl.
CPC .............. *H04L 67/10* (2013.01); *H04L 51/00* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 9,338,046 B2* | 5/2016 | Bose | H04L 67/1097 |
| 2005/0177827 A1* | 8/2005 | Fong | G06F 9/4433 717/171 |
| 2007/0156808 A1* | 7/2007 | Koegel | G06F 9/546 709/203 |
| 2012/0110574 A1* | 5/2012 | Kumar | G06F 9/45558 718/1 |

(Continued)

*Primary Examiner* — Thomas J Dailey
(74) *Attorney, Agent, or Firm* — Tucker Ellis LLP

(57) ABSTRACT

In accordance with an embodiment, a system and method provides a dynamic clustered messaging service in an application server environment. A cluster includes one or more servers operating within the application server environment and is configured to vary a number of the servers based on a service load of applications running on the cluster. The number also varies based on failure and restart of the servers. A messaging service for communicating messages between components of the applications includes instances of messaging service artifacts running on the one or more servers. A placement engine operating on the cluster is configured to migrate the instances of messaging service artifacts between the one or more servers based on a set of rules as the number of the one or more servers in the cluster expands and contracts and as a number of the instances of messaging service artifacts expands and contracts.

19 Claims, 10 Drawing Sheets

(56) References Cited

U.S. PATENT DOCUMENTS

| | | |
|---|---|---|
| 2013/0117289 A1* | 5/2013 | Fischer ............... G06F 17/303 707/756 |
| 2014/0297780 A1* | 10/2014 | Zhou ................ H04L 67/2847 709/216 |
| 2015/0207758 A1 | 7/2015 | Mordani et al. |
| 2015/0370549 A1 | 12/2015 | Zhang et al. |
| 2015/0370608 A1 | 12/2015 | Dipol et al. |
| 2015/0372883 A1 | 12/2015 | Lam et al. |
| 2015/0372887 A1 | 12/2015 | Inamdar et al. |
| 2015/0372936 A1 | 12/2015 | Kasso et al. |
| 2015/0372937 A1 | 12/2015 | Lai et al. |
| 2015/0373004 A1 | 12/2015 | Hopkins et al. |
| 2015/0373097 A1 | 12/2015 | Konkus et al. |
| 2015/0373098 A1 | 12/2015 | Mordani et al. |
| 2015/0373099 A1 | 12/2015 | Dipol et al. |
| 2015/0373117 A1 | 12/2015 | Gleyzer et al. |
| 2015/0378641 A1 | 12/2015 | Patel et al. |
| 2015/0378938 A1 | 12/2015 | Patel et al. |
| 2016/0013983 A1 | 1/2016 | Lu et al. |
| 2016/0014038 A1 | 1/2016 | Thyagarajan et al. |
| 2016/0014191 A1 | 1/2016 | Liu et al. |
| 2016/0014212 A1 | 1/2016 | Zhang et al. |
| 2016/0020949 A1 | 1/2016 | Mares et al. |
| 2016/0085543 A1 | 3/2016 | Islam et al. |
| 2016/0088108 A1 | 3/2016 | Felts et al. |
| 2016/0092278 A1 | 3/2016 | Quinn et al. |
| 2016/0092319 A1 | 3/2016 | Parkinson et al. |
| 2016/0092342 A1 | 3/2016 | Inamdar et al. |
| 2016/0094385 A1 | 3/2016 | Bower et al. |
| 2016/0094403 A1 | 3/2016 | Somogyi et al. |
| 2016/0094404 A1 | 3/2016 | Kasso et al. |
| 2016/0094405 A1 | 3/2016 | Barnes et al. |
| 2016/0094406 A1 | 3/2016 | Phan et al. |
| 2016/0094407 A1 | 3/2016 | Parkinson et al. |
| 2016/0094408 A1 | 3/2016 | Segu |
| 2016/0094473 A1 | 3/2016 | Mordani et al. |
| 2016/0094474 A1 | 3/2016 | Sahoo et al. |
| 2016/0094478 A1 | 3/2016 | Quinn et al. |
| 2016/0094484 A1 | 3/2016 | Mordani et al. |
| 2016/0094486 A1 | 3/2016 | Sahoo et al. |
| 2016/0094498 A1 | 3/2016 | Xiao et al. |
| 2016/0094510 A1 | 3/2016 | Xiao et al. |
| 2016/0094582 A1 | 3/2016 | Watson et al. |
| 2016/0094583 A1 | 3/2016 | Bower |
| 2016/0094624 A1 | 3/2016 | Mordani et al. |
| 2016/0094626 A1 | 3/2016 | Bajaj et al. |
| 2016/0094627 A1 | 3/2016 | Subramanyam et al. |
| 2016/0094635 A1 | 3/2016 | Kannan et al. |
| 2016/0094647 A1 | 3/2016 | Mordani et al. |
| 2016/0142506 A1 | 5/2016 | Sahoo et al. |
| 2016/0231998 A1 | 8/2016 | Islam et al. |
| 2016/0328268 A1 | 11/2016 | Islam et al. |
| 2017/0017494 A1 | 1/2017 | Patel et al. |
| 2017/0019467 A1 | 1/2017 | Inamdar et al. |
| 2017/0019485 A1 | 1/2017 | Dorr et al. |
| 2017/0034071 A1 | 2/2017 | Sidde et al. |
| 2017/0116041 A1 | 4/2017 | Nanjudaswamy |
| 2017/0118137 A1 | 4/2017 | Nanjudaswamy |
| 2017/0126742 A1 | 5/2017 | Hopkins et al. |
| 2017/0192772 A1 | 7/2017 | Islam et al. |
| 2018/0027023 A1 | 1/2018 | Watson et al. |
| 2018/0165087 A1 | 6/2018 | Islam et al. |

\* cited by examiner

US 10,187,454 B2

SYSTEM AND METHOD FOR DYNAMIC CLUSTERED JMS IN AN APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR DYNAMIC CLUSTERED JMS IN A MULTI-TENANT APPLICATION SERVER ENVIRONMENT", Application No. 62/056,428, filed Sep. 26, 2014; and is related to U.S. Provisional application titled "SYSTEM AND METHOD FOR SUPPORTING MULTITENANCY IN AN APPLICATION SERVER, CLOUD, OR OTHER ENVIRONMENT", Application No. 61/929,888, filed Jan. 21, 2014; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to environments for operating application software, and are particularly related to systems and methods for providing and administering dynamic clustered Java Messaging Services (JMS) in an environment for operating application software.

BACKGROUND

Software application servers, examples of which include Oracle WebLogic Server (WLS) and Glassfish, generally provide a managed environment for running enterprise software applications. Further, technologies have also recently been developed for use in cloud environments, which allow users or tenants to develop and run their applications within a partitionable environment, including a multi-tenant cloud environment, and to take advantage of distributed resources provided by such an environment.

The Java Message Service (JMS) application programming interface (API) is an API usable in application server environments for sending information between two or more clients. JMS is a messaging standard that allows application components to create, send, receive, and read messages, allowing communication between different components of a distributed application to be loosely coupled, reliable, and asynchronous.

In a cluster, JMS components typically reside on different servers within that cluster, and can be migrated between servers when necessary. However, reconfiguring JMS functionality, including automatically migrating JMS components between servers upon failure or shutdown of a server, for example, requires high administrative overhead. An administrator must configure, for each component, where that component should be moved in the event that a server on which the component resides is no longer available.

Further, JMS components are migrated as configured, and without considering server load and cluster performance. In application server environments, including multi-tenant cloud environments, server and cluster performance can vary as the environments scale and resources are added and clusters grow and shrink.

SUMMARY

In accordance with an embodiment, described herein is a system and method for providing a dynamic clustered messaging service in an application server environment. In accordance with an embodiment, a cluster includes one or more servers operating within the application server environment and is configured to vary the number of the one or more servers based on a service load of applications running on the cluster. The number also varies based on failure and restart of the one or more servers. A messaging service for communicating information between components of the applications includes instances of messaging service artifacts running on the one or more servers. A placement engine operating on the cluster is configured to migrate the instances of messaging service artifacts between the one or more servers based on a set of rules as the number of the one or more servers in the cluster expands and contracts and as a number of the instances of messaging service artifacts expands and contracts.

DETAILED DESCRIPTION

Described herein are systems and methods for providing a dynamic clustered messaging service for communicating information between components of applications running in an application server environment. A cluster can include one or more servers operating within the application server environment and can be configured to vary the number of the one or more servers based on a service load of applications running on the cluster. The number can also vary based on failure and restart of the one or more servers. In accordance with an embodiment, system and methods can provide a dynamic clustered messaging service that can accommodate the variation in the number of the one or more servers of the cluster.

Systems and methods for providing a dynamic clustered messaging service and a placement engine for use with such systems and methods to migrate instances of messaging service artifacts between the one or more servers of a cluster are intended to be applicable in any application environment, including non-partitionable environments (e.g., legacy environments, such WebLogic domains) and partitionable environments (e.g., a multi-tenant application environments). Systems and methods will be described hereinafter in the context of a partitionable environment, and specifically a multi-tenant environment. However, one skilled in the art will appreciate that systems and method in accordance with embodiments are not intended to be limited to partitionable environments, but rather are intended to be usable in any application server environment.

Application Server (e.g., Multi-Tenant, MT) Environment

Figure 1:
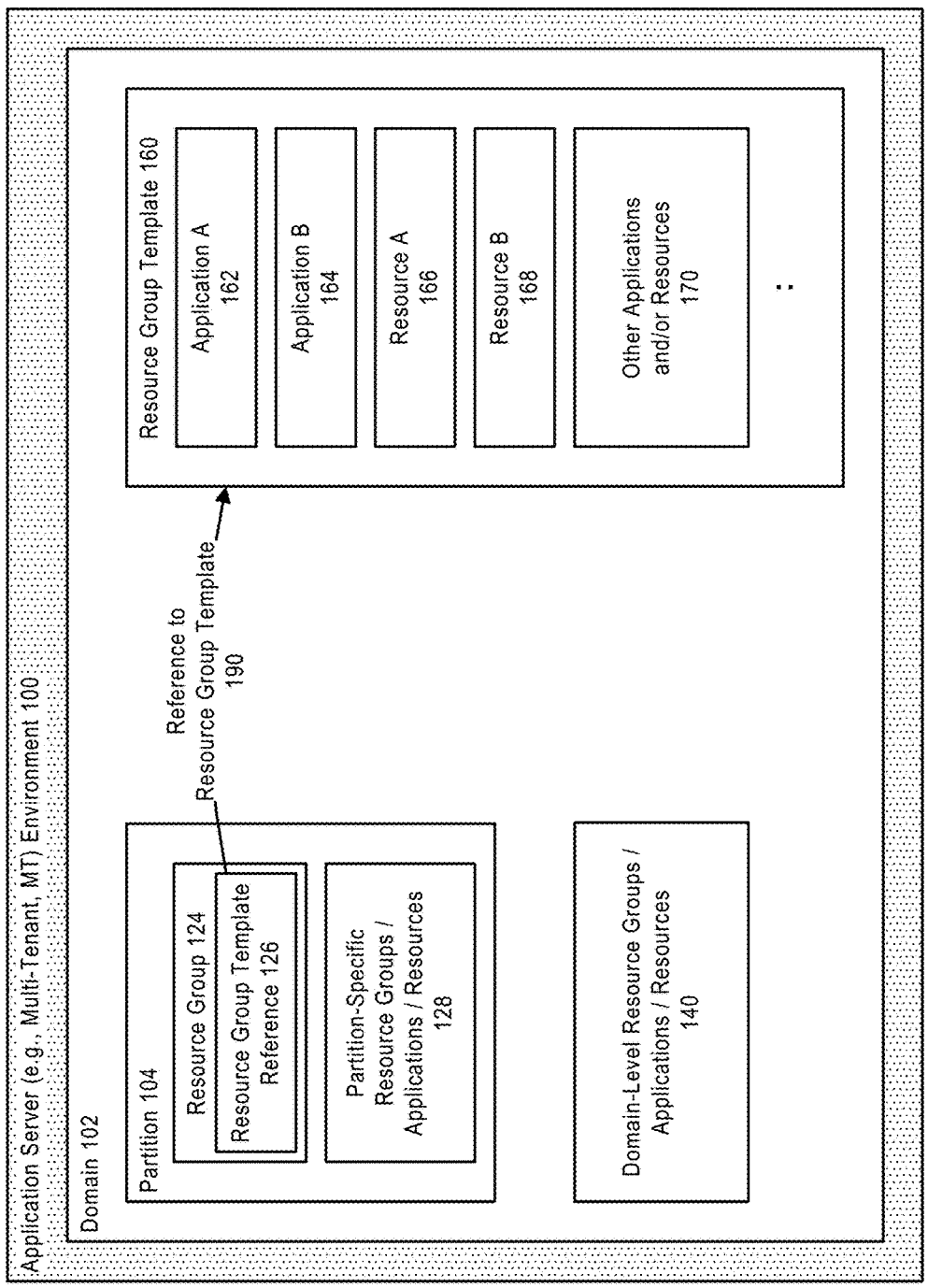
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a domain-level administrator (e.g., a WebLogic domain administrator) can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
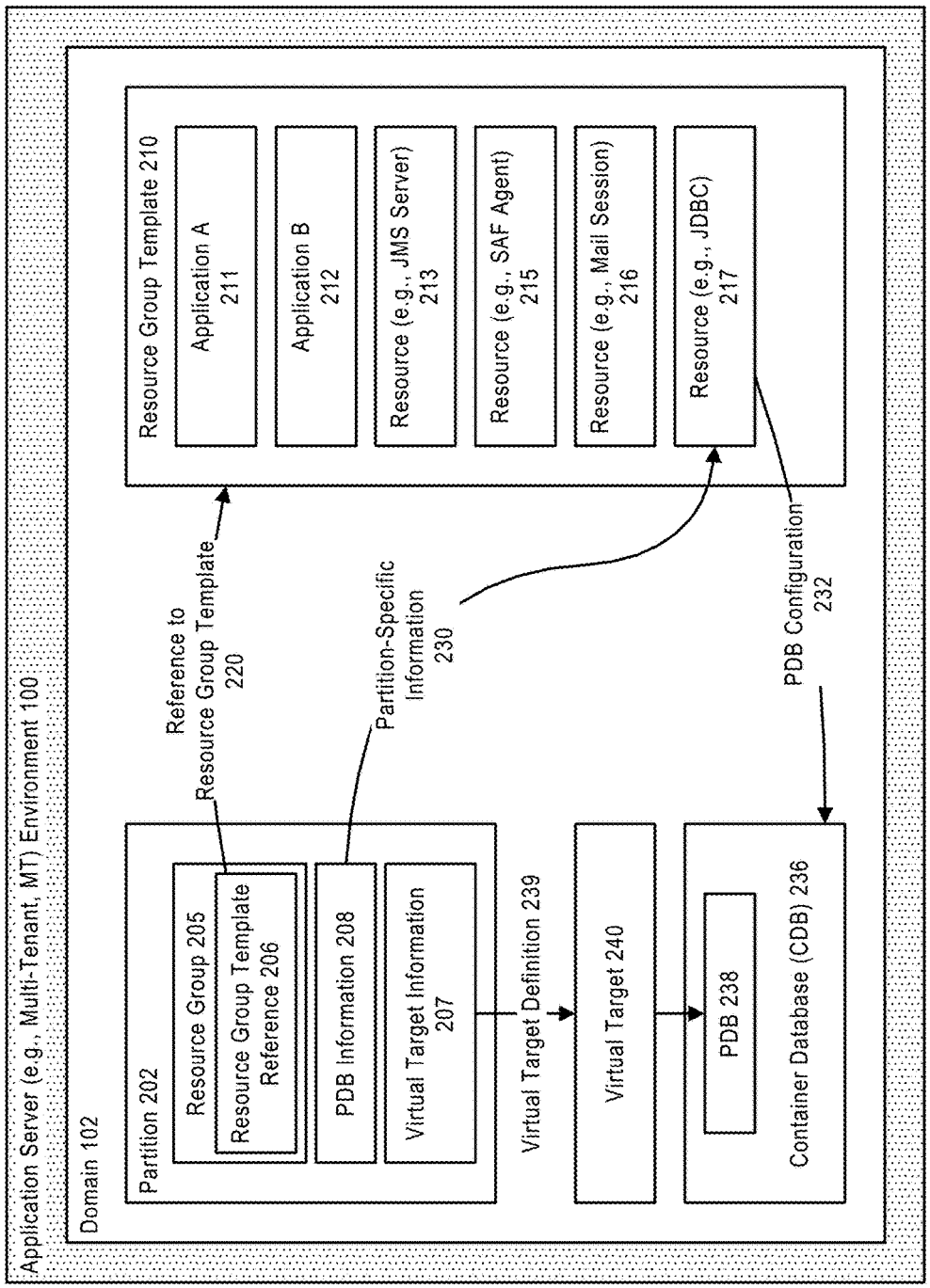
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
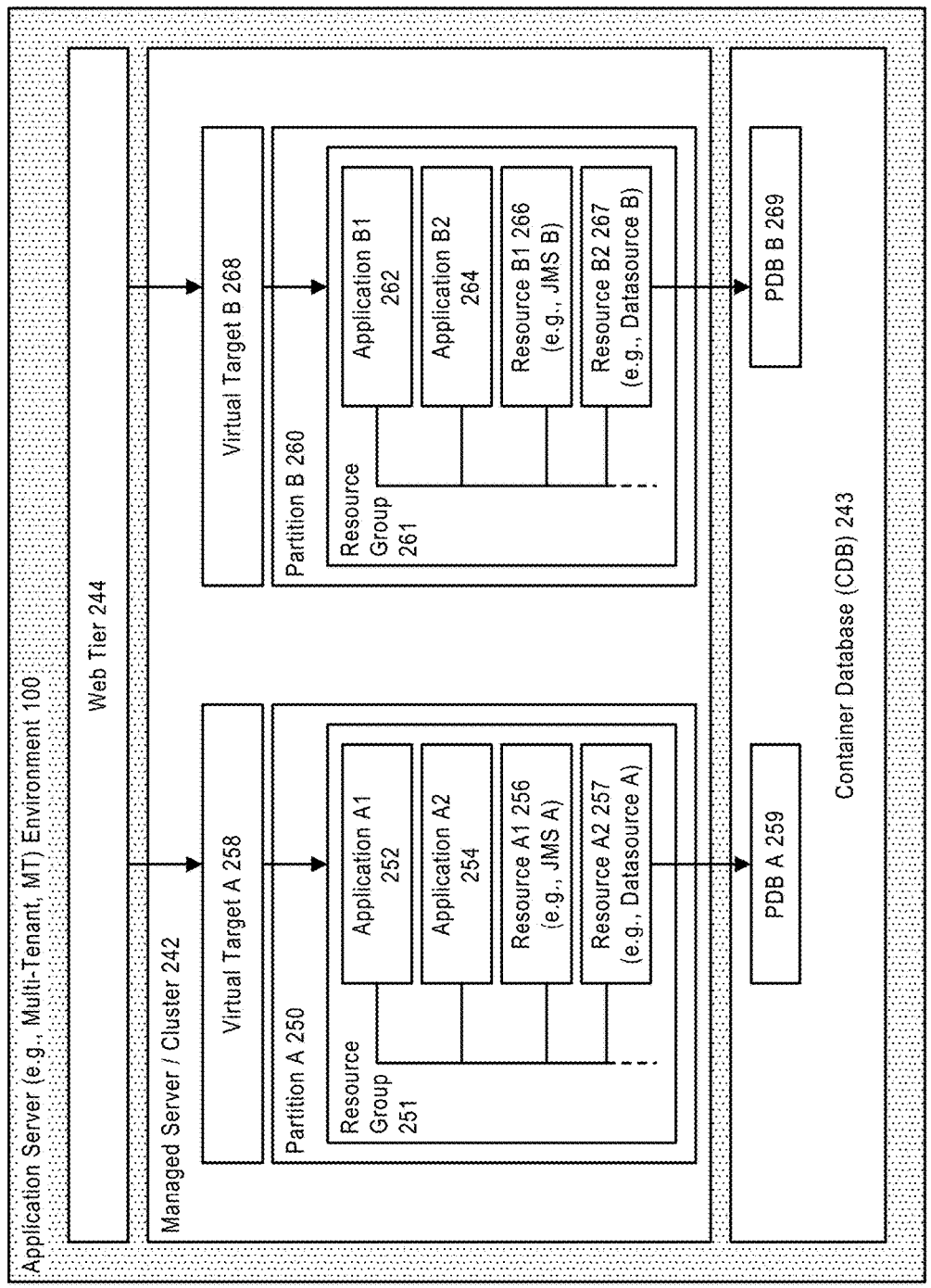
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A domain-level administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shutdown. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
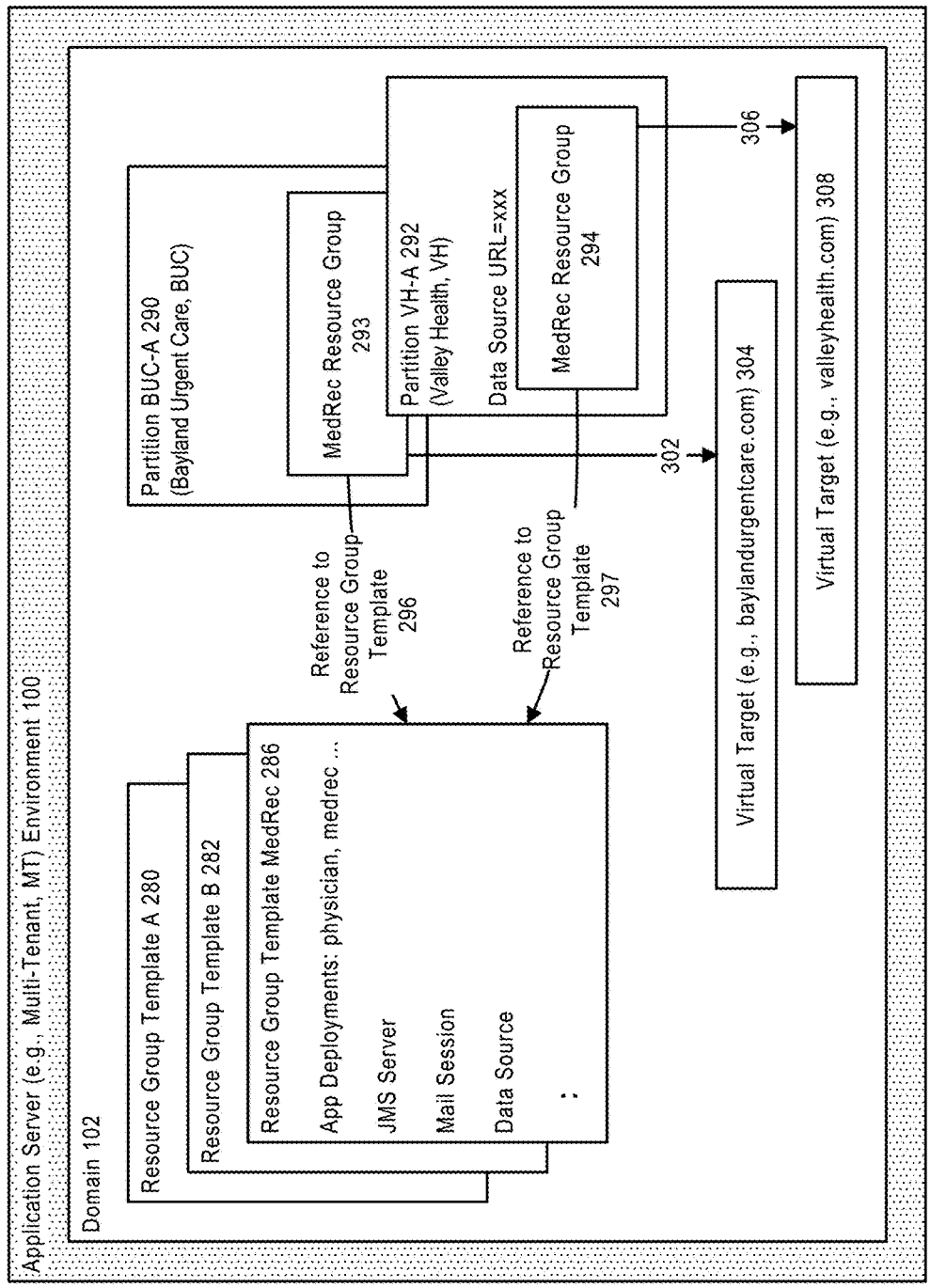
FIG. 4 illustrates an exemplary use of resource group templates, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the domain-level administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
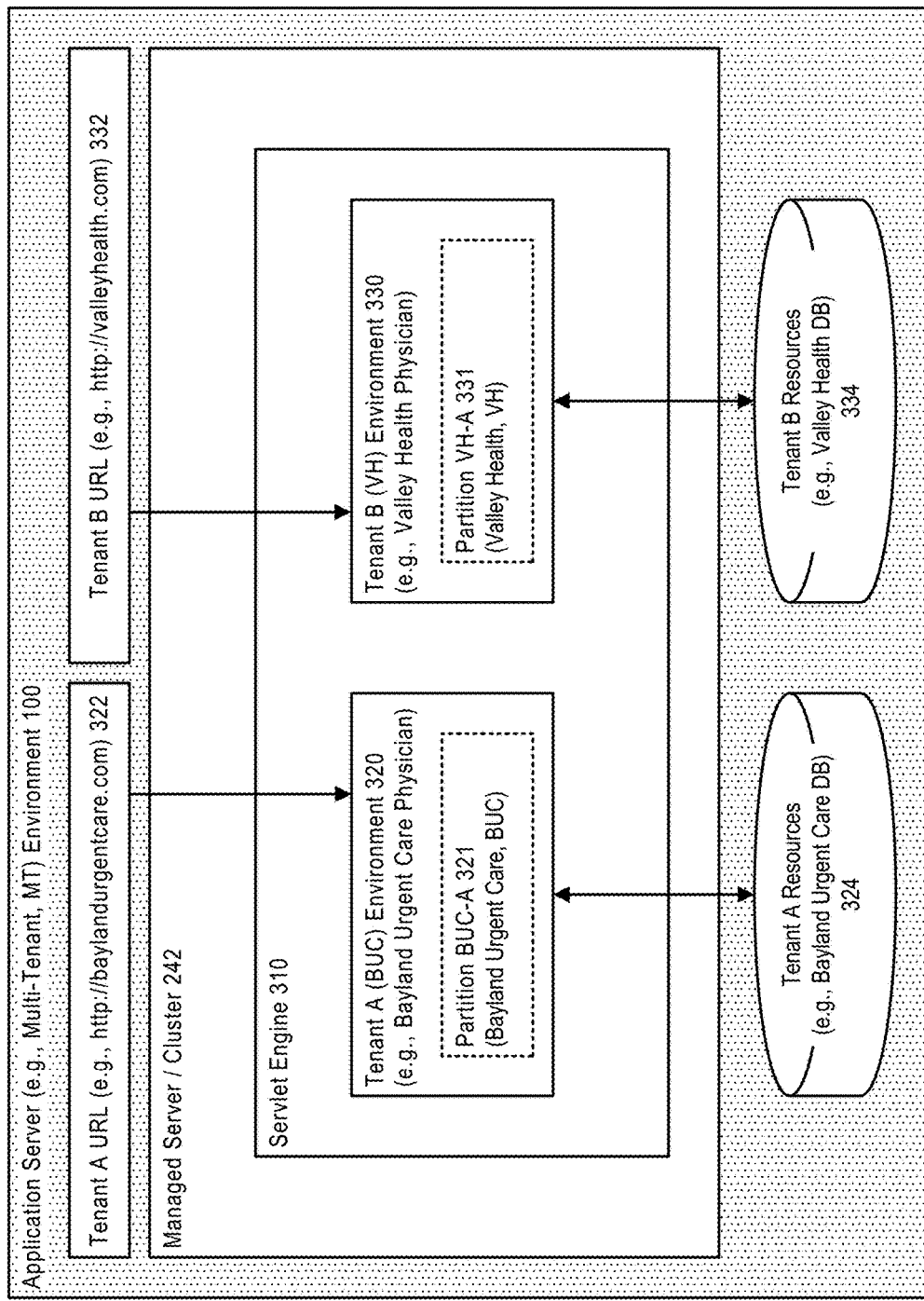
FIG. 5 illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland urgent care database, or a valley health database respectively. The database instances can use compatible schemas, since the same application code will execute against both databases. When the system starts the partitions, it can create the virtual targets and connection pools to the respective database instances.

Dynamic Clustered JMS

In accordance with an embodiment, described herein is a system and method for implementing a dynamic clustered messaging service in an application server environment. The application server environment can be a partitionable environment, such as a multitenant application server environment, or a non-partitionable environment, such as a legacy environment (e.g., a WebLogic Server). The system and method can provide for the ability to grow and shrink clusters of servers, and further provide the ability to rebalance messaging service functionality across clusters. As the load on a system increases or decreases, the required messaging resources can be added and removed accordingly, enabling dynamic scalability. For example, if a server is no longer available due to shutdown or failure, resources associated with the server can be automatically migrated to achieve typically higher availability of the messaging resources.

As noted above, systems and methods for implementing a dynamic clustered messaging service will be described hereinafter in the context of a partitionable environment, but are applicable to any application server environment including non-partitionable environments (e.g., WebLogic Server).

A partitionable (e.g., MT) environment for operating software applications can encapsulate partitioned configuration in resource groups which are cluster targeted. In accordance with an embodiment, messaging services, including JMS, can support cluster targeting. In accordance with an embodiment, messaging services, including JMS, can also enable the ability to handle cluster shrink without trapping messages. Hereinafter, messaging services may be described in the context of JMS, including exemplary deployments, features and configurations of JMS. However, one skilled in the art will appreciate that the description of JMS is merely exemplary, that JMS is merely one type of message service and that embodiments are intended to be applicable to any messaging service usable within a partitionable environment for operating software applications. Further, one skilled in the art will appreciate that a message service is merely one type of service, and that embodiments are intended to be applicable to other services, such as a transaction manager, usable within a partitionable environment for operating software applications.

The ability to allow an administrator to configure logical messaging service artifacts and target them to a cluster either directly in a non-partitionable environment (e.g., a classic WebLogic Server domain) or via a virtual-target in a partitionable environment (e.g., a WebLogic Server MT (WLS-MT) domain) can enable multiple physical instances to be automatically created, one on each server in the cluster, thereby reducing or eliminating the need for laborious and/or repeated configurations steps.

In accordance with an embodiment, JMS artifacts can include messaging bridges, a custom file, JDBC or replicated store, a JMS server that references a custom store, a SAF agent having a custom store and a path service can each be targeted to a single cluster, where the cluster can be of type dynamic, static, or mixed. In accordance with an embodiment, a JMS artifact comprising a SAF agent that references a default store can be targeted to a single static cluster.

In accordance with an embodiment, JMS can provide support for features including unit-of-order (UOO), uniform distributed queues (UDQs), unit-of-work (UOW), replicated distributed topics (RDTs), partitioned distributed topics (PDTs), singleton/standalone destinations, imported destinations (ID), automatic service migration (ASM) and restart-in-place.

UOO and UOW features provide extensions for multiple concurrent strict sub-orderings within a single destination. UOO as a feature enables a stand-alone message producer, or a group of producers acting as one, to group messages into a single unit with respect to the processing order. This single unit is called a Unit-of-Order and requires that all messages from that unit be processed sequentially in the order they were produced. UOW as a feature enables applications to send JMS messages, identifying some of them as a group and allowing a JMS consumer to process them as such. For example, a JMS producer can designate a set of messages that need to be delivered to a single client without interruption, so that the messages can be processed as a unit.

RDTs include a type of uniform distributed topic that replicates each message to each member destination, while singleton destinations include a non-distributed topic or queue hosted on a cluster targeted JMS server.

IDs include the destination definitions that act as local destinations for a SAF agent to forward messages to remote destinations that are either in the same cluster, a remote cluster or even a remote domain.

ASM can enable a failed messaging service instance to migrate and auto-restart on a different server within a cluster. If an application server (e.g., a WebLogic server) hosting a JMS instance goes down, either due to failure or administrative shutdown (both graceful and forced), or if an underlying store instance referenced by a messaging service experiences input/output (I/O) failures, the messaging service instance can automatically failover (i.e., migrate) to another healthy running server within the cluster. ASM can enable recovery of the trapped state of the messaging service instances without requiring restart of the failed application server.

Restart-in-place can enable the messaging server instance to automatically attempt periodic restarts-in-place before attempting to migrate to another server within the cluster if a store of a messaging service instance experiences I/O failures and the host application server remains running.

In accordance with an embodiment, the system can further support the ability to automatically failback a messaging service instance to its original host server when the host server restarts. In an embodiment, automatic failback of a migrated instance will take place for instances that are created with certain configuration settings when the home/preferred server for the instance rejoins the cluster. In an embodiment, the home/preferred server can be a server where the instance was first started.

In accordance with an embodiment, the system can further support automatic load balancing/re-balancing of clustered messaging service instances of a JMS artifact across a clustered server. Automatic load balancing/re-balancing of the clustered instances can help distribute the messaging load (instances) evenly in the cluster using heuristics/runtime statistics. Load balancing/re-balancing of the instances can take place both during migration scenarios as well as overload scenarios.

Figure 6:
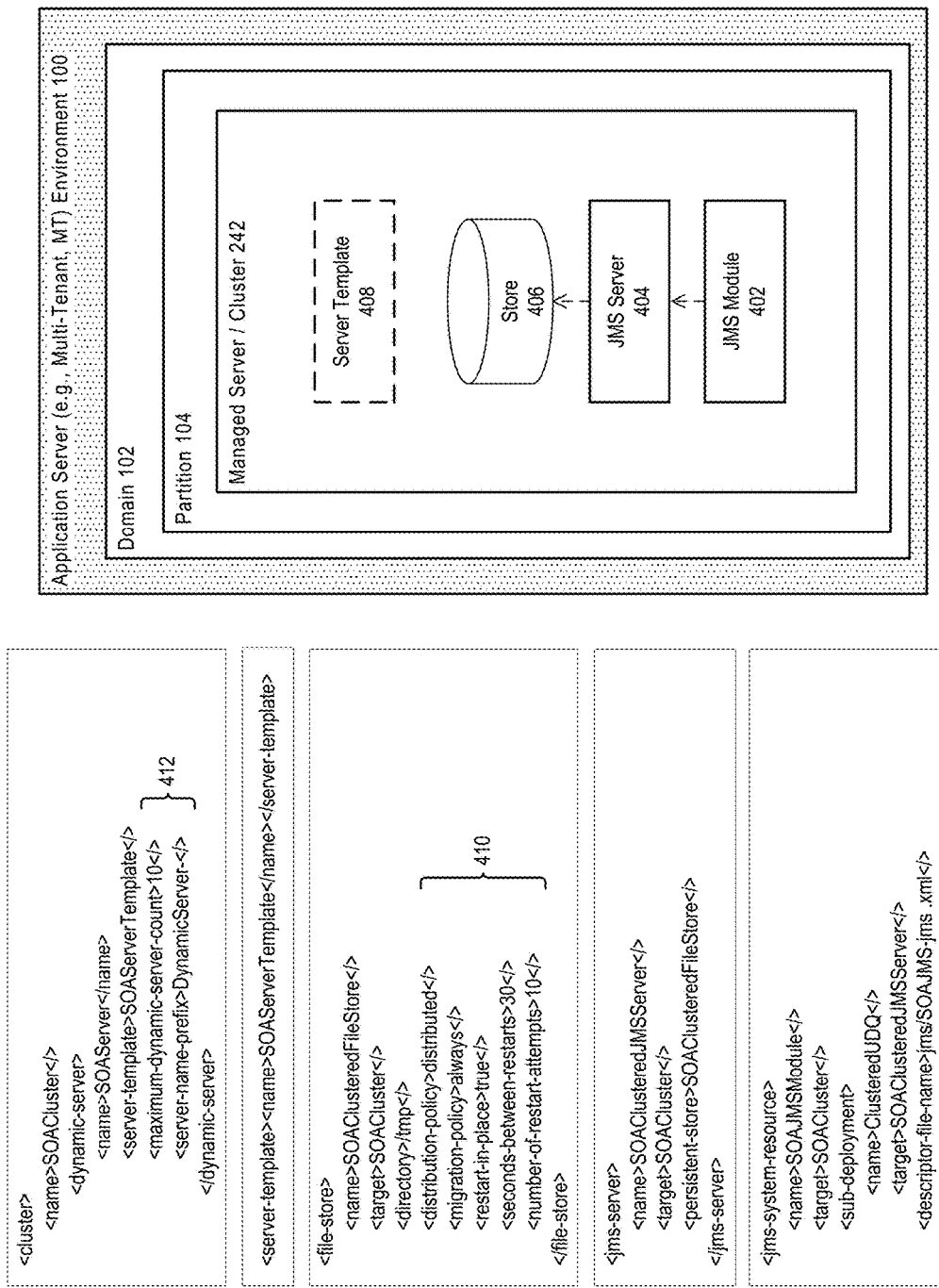
FIG. 6 is a diagram summarizing relationships between messaging configurations for dynamic clustered JMS, in accordance with an embodiment.

FIG. 6 is a diagram illustrating relationships of messaging service (e.g., JMS) artifacts and messaging configuration settings for a cluster (named "SOACluster") 400, in accordance with an embodiment. As shown, the resources include a JMS module (named "SOAJMSModule") 402 that references a JMS server (named "SOAClusteredJMSServer") 404 and is targeted to the cluster. The JMS server references a file store 406 (named "SOAClusteredFileStore") and is targeted to the cluster. The file store is targeted to the cluster. A server template can reference the cluster.

The store is the location in a database or a file system where messages are stored/persisted while they are transmitted to prevent message loss. In accordance with an embodiment, a system and method comprises targeting a cluster rather than a migratable target, and setting a configuration of the cluster in the store. As shown, the artifacts reference one and other, are tied together by the references and targets. Parameters that control service migration (i.e., High Availability (HA) control parameters) 410 are added to the store. As further discussed below, automatic failback of a migrated instance and automatic load balancing/re-balancing can be set in the messaging configuration for the store artifact of the JMS, for example as shown, for instances that are created with configuration "<distribution-policy> distributed</>" in the file store configuration settings.

The system accesses the store and configures the cluster and the artifacts within the cluster based on the configuration within the store, rather than relying on an administrator to set the configuration at every artifact. As further shown, cluster parameters 412 determine the maximum number of servers (e.g. 10) and the server name prefix (e.g., "DynamicServer").

Configuration for High Availability (HA)

In accordance with an embodiment, the clustered and high service availability behavior of cluster targeted JMS can be controlled by a set of HA control parameters on messaging bridges or custom persistent stores. HA control parameters include distribution policy, migration policy and restart-in-place parameters. The distribution policy parameter controls how instances are distributed across a cluster and named. The migration policy parameter controls when automatic instance failover/failback can occur. The restart-in-place parameter controls when an instance can automatically restart in place if a store fails.

Cluster targeted JMS servers, path services, and SAF agents can automatically derive their HA parameter values from their referenced custom store. Both the service and the referenced custom store must be targeted to the same cluster. A JMS server, path service, or SAF agent instance automatically co-locates with a corresponding store instance. For example, if a JMS server named MyJMSServer references the store MyStore where both are targeted to a dynamic cluster, and the distribution policy parameter for the store is appropriately configured, then instances named MyJMSServer@MyDynamicServer-01 and MyStore@MyDynamicServer-01 will be started on application server MyDynamicServer-01. These instances will normally run together on MyDynamicServer-01, but can also migrate together to another server in the cluster in case of failure/load-balancing. After a migration, the name of an instance does not change, thus after migration the instance MyStore@MyDynamicServer-01 will run onMyDynamicServer-02, for example.

The only cluster targetable JMS resource that can reference a default store is a domain level static cluster targeted SAF Agent. Cluster targeted JMS resources do not use migratable targets to enable ASM. Rather the messaging artifacts are targeted to a cluster and use the appropriate HA control parameters to enable ASM.

Distribution Policy Parameter

The distribution policy parameter determines how messaging service instances will be distributed across a cluster, and how they will be named. For purposes of discussion, the two legal values for the distribution policy parameter can include, for example, "SINGLETON" and "DISTRIBUTED", where "DISTRIBUTED" is the default value. One skilled in the art will appreciate that in other embodiments the same distribution policies can be assigned to some other values, whether chosen arbitrarily or chosen in the context of the policy. For example, the distribution policies for the values "SINGLETON" and "DISTRIBUTED" could be assigned to the values "RED" and "ORANGE." Likewise, for other parameters discussed herein values and options given are merely exemplary.

The distribution policy parameter value "SINGLETON" is used for cluster targeted JMS servers that host singleton/standalone (i.e., non-distributed) destinations and a cluster targeted path service. In this mode, a JMS server or a path service will have one instance per cluster that will be named by its configured name along with a suffix (e.g. <configured-name>-01). When the cluster starts, the singleton instance will be automatically started on a single application server chosen by a placement engine. The instance might subsequently move among the servers of the cluster at runtime. When the distribution policy parameter value is set to "SINGLETON", the migration policy parameter should include the value "ON-FAILURE" or "ALWAYS" and cluster leasing should be configured. A store with a distribution policy parameter value set to "SINGLETON" can be referenced by a single path service or multiple JMS servers, but not a mix of the two types.

The distribution policy parameter value "DISTRIBUTED" is used for cluster targeted SAF agents and cluster targeted JMS servers that host uniform distributed destinations (UDDs). In this mode, the cluster automatically ensures that there will be a minimum of one instance per server. Instances are automatically created and named uniquely by naming them after their home/preferred host application server the first time the application server boots (e.g. <configured-name>@<server-name>). When the cluster starts up, the system will ensure that all the messaging service instances are up if possible, and when applicable will attempt an even distribution of the instances. Furthermore, the instances will automatically try to start on their home/preferred server first. Depending on the migration policy parameter value, instances can automatically migrate or even failback as needed to help ensure high availability and even load balancing across the cluster.

Migration Policy Parameter

The migration policy parameter determines whether and how messaging service instances are migrated between servers in a cluster. For purposes of discussion, the legal values for migration policy parameter can include, for example, "OFF", "ON-FAILURE", and "ALWAYS", where the migration policy parameter can be set to "OFF" by default.

The migration policy parameter value "OFF" completely turns off HA, including the restart-in-place feature. Any instance will be pinned to and cannot move off of the home/preferred server of the instance for the lifetime of the instance, and will start up and shut down along with the host application server. For example, a distributed JMS server instance MyJMSServer@MyServer-01 will only run on the application server MyServer-01 in a cluster. If the host application server MyServer-01 goes down, the corresponding JMS server instance MyJMSServer@MyServer-01, along with its destinations and messages remain unavailable until the application server MyServer-01 restarts. In this example, both MyJMSServer@MyServer-01 and MyStore@MyServer-01 are local instances on application server MyServer-01, which is designated the home server for these instances.

The migration policy parameter value "OFF" supports backwards compatibility and use cases where customers or layered products maintain a one-to-one relationship between a particular application server and a particular JMS server such that the particular JMS server instance is pinned to that particular application server instance. This parameter value is not combined with the distribution policy parameter value "SINGLETON".

The migration policy parameter value "ON-FAILURE" enables the system to automatically migrate messaging service instances only after an instance failure or a crash/bad health indication of its associated store instance or hosting application server instance. The instances will not migrate when there is an administrative shutdown (both forced and graceful). In this mode, the system will continue to try to automatically failback the instances whenever its home/preferred server comes back up when the distribution policy parameter value is set to "DISTRIBUTED". This policy requires cluster leasing to be configured.

The migration policy parameter value "ALWAYS" enables the system to always automatically migrate messaging service instances, regardless of whether the application server instance is administratively shutdown (forced or graceful) or experiences a crash/bad health indication of its associated store instance or hosting application server instance. This will allow the instances to move for load balancing, dynamic growth and shrinkage of cluster membership, or during service/server failure scenarios. When the distribution policy parameter value is set to "DISTRIBUTED", the system will also try to automatically failback the instances whenever the home/preferred server comes back up. This policy requires cluster leasing to be configured.

In according with an embodiment, messaging bridges are a type messaging service that do not use any persistent store and hence the HA control parameters are directly configured on the appropriate mbean. Their HA behavior is equivalent to Store HA behavior, and is the same as defined above.

Restart-In-Place Parameter

The restart-in-place parameter enables periodic automatic restart of a failing store instance(s) on a healthy application server, and the restart of any service instance that references the store. For purposes of discussion, the legal values for restart-in-place parameter can include, for example, "TRUE" and "FALSE", where the migration policy parameter can be set to "TRUE" by default. The restart-in-place parameter is ignored when the value of the migration policy parameter is set to "OFF". Further, the restart-in-place parameter is not applicable to messaging bridges, which instead automatically restart their internal connections as needed.

Other HA Configuration Attributes

In accordance with an embodiment, a seconds-between-restarts parameter can be included with the restart-in-place parameter and can specify how many seconds to wait in between attempts to restart-in-place a failed service. In accordance with an embodiment, the seconds-between-restarts parameter can be set to "30" by default.

In accordance with an embodiment, a number-of-restart-attempts parameter can be included with the restart-in-place parameter and can specify how many restart attempts to make before migrating the failed services. The restart attempts are consecutive attempts. For example, if the value is set to "6", and the service restart fails five times before succeeding, but then fails again later, it will not instantly migrate. Thus, each failure gets its own count of restart attempts. In accordance with an embodiment, the number-of-restart-attempts parameter can be set to infinite by default if the migration policy parameter is set to "OFF" and set to "6" by default if the migration policy parameter is set to "ON-FAILURE" or "ALWAYS." A value of "0" is equivalent in result to setting the restart-on-failure parameter value to "FALSE". A value of "−1" indicates that service should never be migrated. Instead, the service will be restarted until the service either works or the server shuts down.

In accordance with an embodiment, an initial-boot-delay-seconds parameter determines the length of time to wait before starting an instance of an artifact on a server. A value of "0" indicates to the system that it does not need to wait. A value of "−1" indicates to the system that the system default should be used. The initial-boot-delay-seconds parameter instructs the placement engine to delay before starting to load up a newly restarted application server with service instances after an application server boots. The parameter can give extra time for the system to stabilize after a failure rather than forcing it to run an instance right away, and can give time for more candidate servers to boot in a cluster instead of loading up the first servers to boot in a cluster with all instances.

In accordance with an embodiment, a failback-delay-seconds parameter determines the length of time to wait before failback of an artifact to its preferred server. This setting only applies when the migration policy parameter is "ON-FAILURE" or "ALWAYS." A value of "0" indicates to the placement engine of the system that it does not need to failback the preferred server and can select whatever artifacts (if any) it feels are best to move. A value of "−1" indicates to placement engine that the system default should be used. The failback-delay-seconds parameter instructs the placement engine to delay before failing an instance of an artifact back to its newly restarted user preferred server after a failure. This allows time for a system to stabilize and other services to be restarted. The parameter can allow time for the system to stabilize before it is loaded up with more resources, since often the reason why a system fails is still present when it reboots.

Instance Naming Conventions

In accordance with an embodiment, runtime/physical instances of cluster targeted messaging services artifacts can be uniquely named based on the chosen value of the distribution policy parameter. For example, an instance with a distribution policy parameter value set to "DISTRIBUTED" can use a naming convention conforming to <configured-name>@<server-name>, while an instance with the distribution policy parameter value set to "SINGLETON" can use a syntax conforming to <configured-name>-01, although in the case of a path service, the number will be a two digit zero-filled instance number that is internally used to have more than one instance of path service evenly distributed across the cluster.

For file stores targeted at a cluster, data files of an instance can be uniquely named based on the corresponding store instance name. For example, for an instance with a distribution policy parameter value set to "DISTRIBUTED", files of the instance can use a syntax conforming to <Store name>@<Server instance name>NNNNNN.DAT, where <NNNNNN> is a number ranging from 000000-999999. A single file instance may create one or more .DAT files.

Similar to file stores, a replicated store instance's regions can be uniquely named based on the corresponding store instance name. For example, for an instance with a distribution policy parameter value set to "DISTRIBUTED", the instance can use a syntax conforming to <configured Replicated Store name>@<Server instance name>NNNNNN.RGN.

In accordance with an embodiment, a database table name for a JDBC store will have a default value (e.g., WLStore). However, the database table name can be changed via the JDBC store PrefixName setting to ensure that different JDBC stores use a different backing table, as two different JDBC store instances cannot share the same backing table. When a JDBC Store is targeted to a cluster, the corresponding database table name can be generated based on the distribution-policy setting.

As shown, for an instance with a distribution policy parameter value set to "DISTRIBUTED", the JDBC table name substitutes an "_" in place of the "@" character between the <configured-jdbc-store-name> and the <server-name> as "@" is an invalid character for a database table name. Similar substitutions are made for other invalid characters (e.g., "+", "−" and any whitespace character) in any of the configured Store name settings (store name, prefixname or server name).

Resource Targeting Rules

In accordance with an embodiment, messaging services including JMS servers, SAF agents, messaging bridges and path services that are targeted to a cluster. Messaging services other than messaging bridges can reference a custom persistent store that is also targeted to the same cluster. The store reference cannot be set to null, except where an SAF agent targets a static cluster with default HA settings, including a distribution policy parameter value set to "DISTRIBUTED" and a migration policy parameter value set to "OFF". The SAF agent will use the legacy singleton default file store available on every server if there is no custom store configured, in which case the SAF agent will not be able to take advantage of the ASM/HA feature. The HA parameter settings on a persistent store can be used to control distribution and migration behavior of JMS servers, SAF agents, and path services that reference that particular persistent store. For messaging bridges, the HA settings can be set directly on the bridge configuration itself.

HA policies are ignored for individually targeted services. If the restart-in-place parameter value is set to "TRUE", or the migration policy parameter value is set to anything other than "OFF", and a JMS resource is targeted to anything other than a cluster or null, then a warning message will be logged that the settings will be ignored. Optionally, this restriction can be relaxed to allow restart-in-place to be active when services are targeted to a single application server.

A path service is supported for each cluster at the domain scope for non-resource group domain scoped distributed destination, and a path service is supported for each resource group for resource group template scoped distributed destination. A non-resource group domain scoped distributed destination will not use a resource group scoped path service, and a resource group template scoped distributed destination will not use a path service from another resource group template.

Failed Health State

In accordance with an embodiment, the health state behavior of messaging services including JMS servers, SAF agents, and store instances can be tracked via a respective runtime mbean attribute for each and affects the application server health. Messaging services including a JMS server, SAF agent, and path service can only go into a failed health state if their referenced store enters into a failed health state, and the referenced store will only enter into a failed health state if the referenced store is suffering from underlying I/O operation failures (e.g., open/read/write/delete failures or network issues in the case of JDBC or replicated stores).

A failing cluster targeted store instance enters a fatal failed health state if its migration policy parameter value is set to "OFF" and enters a non-fatal failed health state for "EXACTLY-ONCE" or "ON FAILURE". A restart/migration framework (e.g., WebLogic Whole Server restart/migration framework), if configured and active, may then choose to restart or migrate a server JVM in the fatal failed health state case.

Messaging bridges are stateless and do not use a store, and the health state of a messaging bridge is not registered/tracked via a health monitoring subsystem. Instead the state of a messaging bridge instance is marked as "Active/Running (HEALTH_OK)" or "Inactive/Stopped (HEALTH_WARN)" for internal use and this state is exposed via an API.

Persistent Store Service Requirements

In accordance with an embodiment, when a custom persistent Store is configured and targeted to a cluster, the cluster will start corresponding instances based on the HA control parameters as configured on the store MBean.

Both domain scoped SAF agents that are targeted to a "static" cluster and domain scoped JMS servers/SAF agents that are targeted to a single application server (e.g., a single WebLogic Server) can take advantage of a legacy default store for their persistence. The default store will not support any of the HA policy settings, which are left at their default. Default stores are not supported by JMS servers, SAF agents targeted to a dynamic cluster, and path services in all other cases.

A custom persistent store defined in a resource group scope can inherit targeting from resource group targeting, and resolve to unset, single cluster, or a single application server (mbean legal check). If the targeting resolves to a single-server, then the new HA parameters described in this paper do not apply and should be left at their defaults. The default store is not available for resource group/resource group template scoped JMS services. An mbean legal check failure will result if such services do not reference a custom store.

Messaging Service Requirements

In accordance with an embodiment, JMS servers host JMS destinations, including distributed destination's physical members, temporary destinations, as well as single stand-alone (non-distributed) destinations. When a JMS server is configured and targeted to a cluster, the JMS server will have "physical/runtime" instances created/started cluster members (application server instances) when the cluster starts based on the HA parameters of an associated custom store.

JMS servers must (a) target any type (dynamic, static or mixed) of cluster, and (b) reference a custom persistent store that targets the same cluster to run cluster targeted. An attempt to target a JMS server to a cluster without also configuring the JMS server to reference a similarly targeted/scoped custom store will result in an mbean constraint violation. Neither the console nor JMX MBeans will permit such an attempt and will throw an mbean configuration exception.

JMS server destinations that are defined in a module can specify a module sub-deployment. The sub-deployment references a single clustered JMS server that is targeted to the same cluster that hosts the destinations in the module and has its associated store's distribution-policy set to "DISTRIBUTED". If these conditions are not satisfied, then the destination resource configuration will be ignored, and an error message will be logged. This ensures that the destinations are created on the exact desired JMS servers. In a partitionable environment, the legal sub-deployment targets are restricted to JMS servers in the same resource group template as the module, and purely domain scoped modules will not be able to reference a sub-deployment that's defined in a resource group template.

In a domain for a partitionable environment, when a module is defined in a resource group, default targeting is scoped to those qualified JMS servers in the same resource group, otherwise it is scoped to all non-resource group JMS servers in the same cluster. A configuration validation check can be performed to ensure this and an appropriate error will be logged when rules are violated.

Replicated Distributed Topic

An RDT is a form of UDD. In accordance with an embodiment, the use of an RDT can be limited to specific non-elastic use cases. When using an RDT, an administrators must ensure that all of the member topics on all configured servers in the target cluster are running. If an RDT can be setup to auto-migrate its members, the administrator must ensure that the entire cluster is successfully booted at least once so that all members are known and initialized properly. However, some topic access patterns do not support migration.

If members are unavailable for long periods, the replicated topic's internal forwarder subscriptions will accumulate many messages while waiting for the inactive members to re-activate, potentially leading to quota exceptions or out-of-memory exceptions. Some use cases can be setup to automatically expire old messages.

Partitioned Distributed Topic

A partitioned distributed topic (PDT) is a subclass of UDD. In accordance with an embodiment, a PDT is fully supported on cluster targeted JMS servers, unlike RDTs. For most use cases, PDTs are recommended instead, and singleton topics may also serve as a viable alternative.

Singleton (i.e., non-distributed/standalone) destinations are not typically regularly used in a cluster targeted JMS server, but are supported. If singleton destinations are required, then the sub-deployment of that singleton destination references a JMS server which in turn references a store that has its distribution policy parameter value set to "SINGLETON", otherwise a configuration error will be logged and the module deployment will fail. Default targeting is not enabled for singleton/standalone destinations, if attempted, a configuration error will be logged and the module deployment will fail.

Foreign servers and destinations are a module resource, and are simply a configured local JNDI name reference to a location of a (possibly) remote destination. Foreign servers and destinations are supported in all cluster types already, and, similar to connection factories, users are encouraged to use module default targeting, with no need to explicitly specify a sub deployment.

SAF Service Requirements

In accordance with an embodiment, applications that use the JMS SAF feature, as well as Web-Services Reliable Messaging (WS-RM) applications, need to configure SAF agents. SAF agents host SAF imported destinations and are used to store-and-forward messages from one location to another.

Cluster targeted SAF agents should reference a custom persistent store that targets the same cluster in order to run in a cluster. If a cluster targeted SAF agent references a custom store, the store must be targeted to the same cluster.

If a SAF agent is configured in a resource group in a partitionable environment, the SAF agent must reference a custom store.

Additionally, unlike static cluster targeted JMS servers and path services, a domain scoped static cluster targeted SAF agent can also use the legacy default store as a special case that is only supported for backward compatibility purposes. This configuration will not have any form of HA support including restart in place.

SAF imported destinations automatically create a member on each SAF agent instance of the configured clustered SAF agent specified in their sub deployment or default target. SAF imported destinations that are defined in a module can specify a module sub-deployment. The sub-deployment must reference a single clustered SAF agent that is targeted to the same cluster that hosts the module and has its distribution-policy parameter value set to "DISTRIBUTED" (i.e., qualified/chosen SAF agents). If these conditions are not satisfied, then the destination resource configuration will be ignored, and an error message will be logged. This ensures that the destinations are created on the exact desired JMS servers. In partitionable environments, the only legal sub-deployment targets will be further restricted to JMS servers in the same resource group template as the module, and purely domain scoped modules will not be able to reference a sub-deployment that is defined in a resource group template.

Default targeting of imported destinations is also possible. For example, in an application server (e.g., WebLogic server) domain, when default targeting for an imported destination resolves to a cluster, then all SAF agents will be chosen to host the imported destination members. In a domain within a partitionable environment, when a module is defined in a resource group, default targeting is scoped to those qualified SAF agents in the same resource group, otherwise it is scoped to all qualified SAF agents in the same cluster. A configuration validation check ensures this and an appropriate error is logged when rules are violated.

If an imported destination is configured to forward to a remote distributed destination that is in turn hosted on a cluster, then an administrator must ensure that all members of the remote distributed destination are typically active. Otherwise, messages that have had a previously failed forward attempt may become "stuck", as such message forwarding can resume/restart only to the exact same remote distributed destination member. This can be avoided by configuring the remote destination so that's it is hosted on JMS servers with the distribution-policy parameter value set to "DISTRIBUTED" and the migration-policy parameter value set to "ALWAYS" or "ON FAILURE".

Path Service, Unit-of-Order, and Unit-of-Work

In accordance with an embodiment, some applications can leverage UOO or UOW extensions. These extensions ensure that all messages marked with the same UOO/UOW name are all processed in exactly the same order in which they were produced to a destination. This feature requires special consideration when used in a cluster in combination with a distributed destination or an imported destination.

UOO and UOW messages produced to a distributed or imported destination are routed to a specific member that is the designated host for that particular UOO/UOW name. To tune this routing, the distributed destination mbean and imported destination mbean have a routing policy. For purposes of discussion, the two options for routing policy can include, for example, "HASHED" and "PATH SERVICE", where "HASHED" is the default value.

The routing policy option "PATH SERVICE" depends on a separately configured path service that persists UOW/UOO routes. The positive aspect of routing policy option "PATH SERVICE" is that it will work as the members and servers change. The negative aspect of routing policy option "PATH SERVICE" is that it requires a remote persistent write (and later a delete) for each uniquely named UOO or UOW. The positive aspects of routing policy option "HASHED" are that hashing does not require writing to highly available persistent storage and UOO routing can be computed directly from the UOO or UOW name and the static list of configured distributed destination members. The negative aspect of routing policy option "HASHED" is that if the numbers of members change, then UOO or UOW may not work correctly.

When a UOO/UOW message is sent by an application, an exception can be thrown in different circumstances with either of the routing policy options. For example, if the routing algorithm picks a distributed destination member that is not yet available, then an exception is thrown even though other members are available. Although this is less likely with the routing policy option set to "PATH SERVICE", it can still occur. Another case when an exception is thrown is when the path service itself is unavailable or migrating and the routing policy option is set to "PATH SERVICE".

Unit-of-Order and Unit-of-Work Requirements

In accordance with an embodiment, using UOO and UOW in the case of cluster targeted JMS servers or SAF agents has the following requirements.

A distributed or imported destination hosted on a cluster-targeted JMS server or SAF agent must specify a routing policy option of "PATH SERVICE", with the exception that a static cluster targeted SAF agent that does not specify a custom store (i.e., store is null) can specify a routing policy option of "HASH". Otherwise, an attempt to produce a UOO/UOW a message will throw an exception.

If a distributed or imported destination is configured with a routing policy of "PATH SERVICE", then a path service must be configured in the same scope or an mbean validation failure is thrown.

Only one path service can be explicitly configured per available scope, and any attempt to configure more than one path service at any particular scope will result in an mbean validation failure. The available scopes include a cluster in a classic domain (i.e., a path service that is not in a resource group template and is either directly targeted to the cluster, or targeted to a specific server or migratable-target within the cluster), a non-clustered server in a domain partition (i.e., a path service that is not in a resource group and targeted directly to a non-clustered server), a resource group template in a domain partition, a resource group in a domain partition, and a resource group in a custom partition.

A path service must specify a custom store with the same target when targeted to a cluster, and the custom store must specify a migration policy parameter value of "ALWAYS" or "ON FAILURE" and a distribution policy parameter value of "SINGLETON". If a path service is defined as part of a resource group or a resource group template in a partitionable environment, its store is defined in the same resource group or resource group template.

A path service can start multiple instances in a scope.

Message Bridge Service

In accordance with an embodiment, the HA control parameters generally apply when a message bridge is targeted to a cluster. For example, a distribution policy parameter value set to "DISTRIBUTED" causes one bridge instance to be created and started on each application server (e.g., WebLogic server). Some users may want to start only a single bridge, in which case they can set the bridge distribution policy parameter value to "SINGLETON". Messaging bridges depend on bridge adapters. Such adapters are targeted to the same cluster.

Messaging bridges are stateless, thus both the "ALWAYS" and "ON-FAILURE" migration policies can have the same semantics at runtime and when a cluster starts from zero. An "ALWAYS" migration may cause "thrashing" at the cluster startup time. To avoid such a problem, in an embodiment only an "ON-FAILURE" migration policy is supported for messaging bridges. A validation error can be logged when the users try to configure migration-policy to "ALWAYS". The migration policy can therefore be configured either as "ON-FAILURE" or left as default (migration-policy="OFF").

In accordance with an embodiment, messaging bridges can ignore restart-in-place settings, as they already have the built-in mechanism to retry failed operations.

Placement Engine

In accordance with an embodiment, the core HA framework provides a singleton monitor that is responsible for notifying the JMS subsystem when events happen in the cluster including grow, shrink and system failures. JMS implements an internal placement engine which is registered with the singleton monitor and is responsible for selecting where JMS resources such as messaging bridges, JMS servers and stores are laid out across the set of servers which comprise the current cluster. This is transparent to the users as it has no configuration or runtime MBeans.

The placement engine handles "restart-in-place" (if configured) for failed JMS artifacts, supports failback (if configured) for JMS artifacts, requests the creation of new instances of JMS artifacts when the system grows for dynamic artifacts (for artifacts with distribution policy parameter values set to "DISTRIBUTED"), selects the location for an instance of a JMS artifact on a specific application server (e.g., WLS server) as the system grows, shrinks (for artifacts with migration policy parameter values set to "ALWAYS"), and selects the location for an instance of a JMS artifact on a specific application server (e.g., WLS server) when needed for migration (for artifacts with migration policy parameter values set to "ON-FAILURE" or "ALWAYS").

The placement engine selects an application server for a messaging artifact using criteria including the preferred server of the artifact (for artifacts with distribution policies parameter values set to "DISTRIBUTED"), the server load, the number of JMS artifacts on a server, the "weight" of the artifact (e.g. backlog), and the success of placing an artifact on that server in the recent past (e.g. if a repeated number of failures occur, a server may be temporarily marked as "suspect").

Figures 7A, 7B:
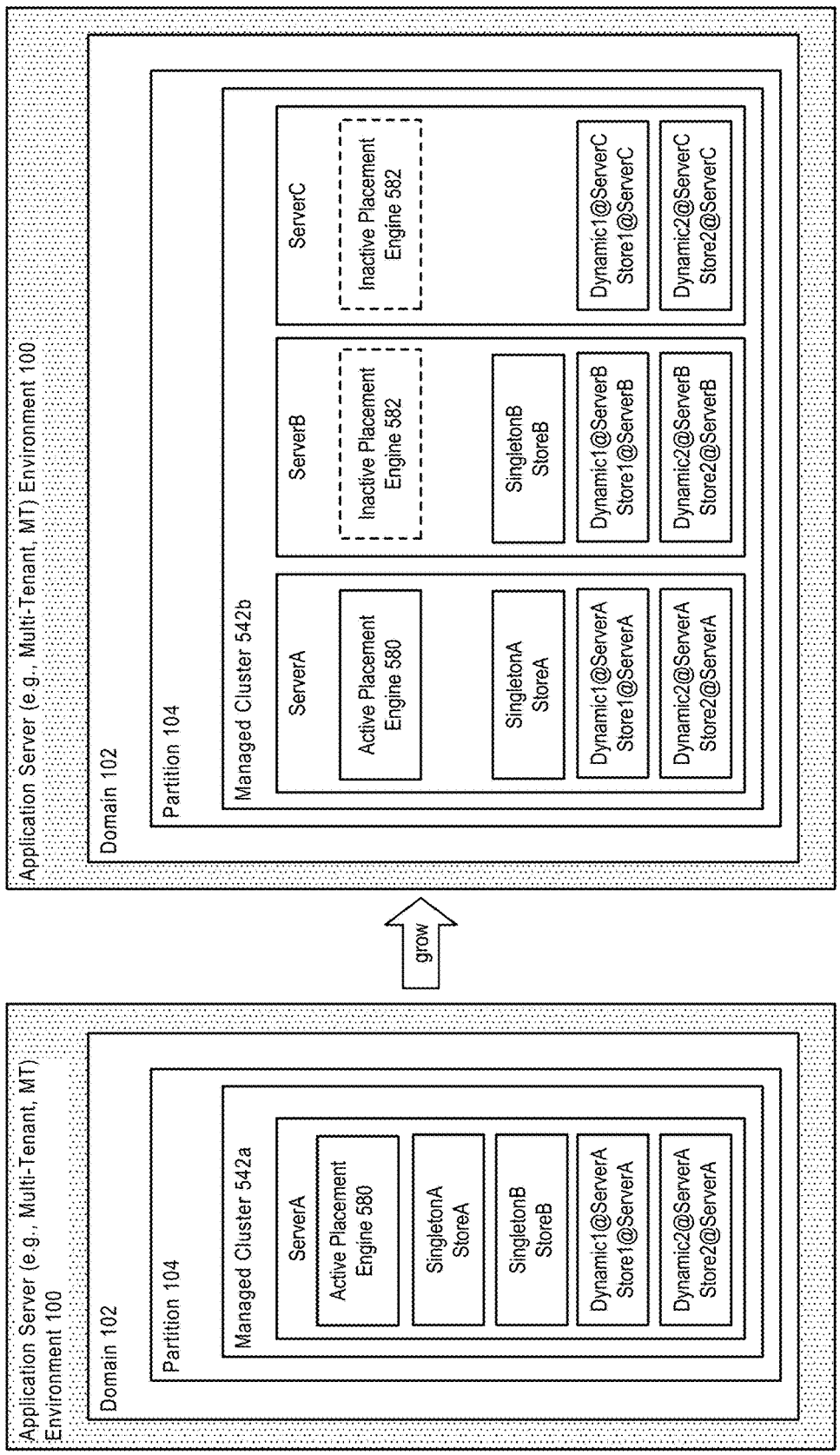
FIGS. 7A and 7B illustrate dynamic clustered JMS in a multi-tenant application server environment comprising a placement engine for migrating JMS artifacts when growing a cluster, in accordance with an embodiment.

FIGS. 7A and 7B illustrate an example of a placement engine placing messaging artifacts in a cluster 542a, in accordance with an embodiment. As shown, in an embodiment, when each server is started it includes an inactive version of a placement engine 582. One of these placement engines for one of the servers is activated. If a server on which an active placement engine is no longer available, or if the active placement engine otherwise fails, an inactive version of a placement engine on another server will be activated.

As shown, the placement engine 580 of ServerA is activated. The active placement engine (referred to hereinafter simply as "the placement engine") re-balances the load in the cluster 542*a* including a single server, ServerA, on which is running a pair of store instances with distribution policy parameter value "SINGLETON" and a pair of store instances with distribution policy parameter value "DISTRIBUTED". Two servers, ServerB and ServerC, are added to the cluster 542*b* including ServerA and the placement engine migrates one of the singleton instances, SingletonB, from ServerA to ServerB. The placement engine also creates instances on each of the newly added servers ServerB and ServerC for the store instances Dynamic1 and Dynamic2, in accordance with their distribution policy parameter settings.

The placement engine can balance the load of JMS artifacts based on a set of rules associated with the placement engine, and can re-balance the load of JMS artifacts as determined by this set of rules and/or using performance metrics gathered by the cluster. In accordance with an embodiment, the placement does not store data, and a newly activated placement engine will determine the status of the cluster upon activation and begin refining the re-balancing of JMS artifacts based on the rules and/or performance metrics gathered thereafter.

Figure 8:
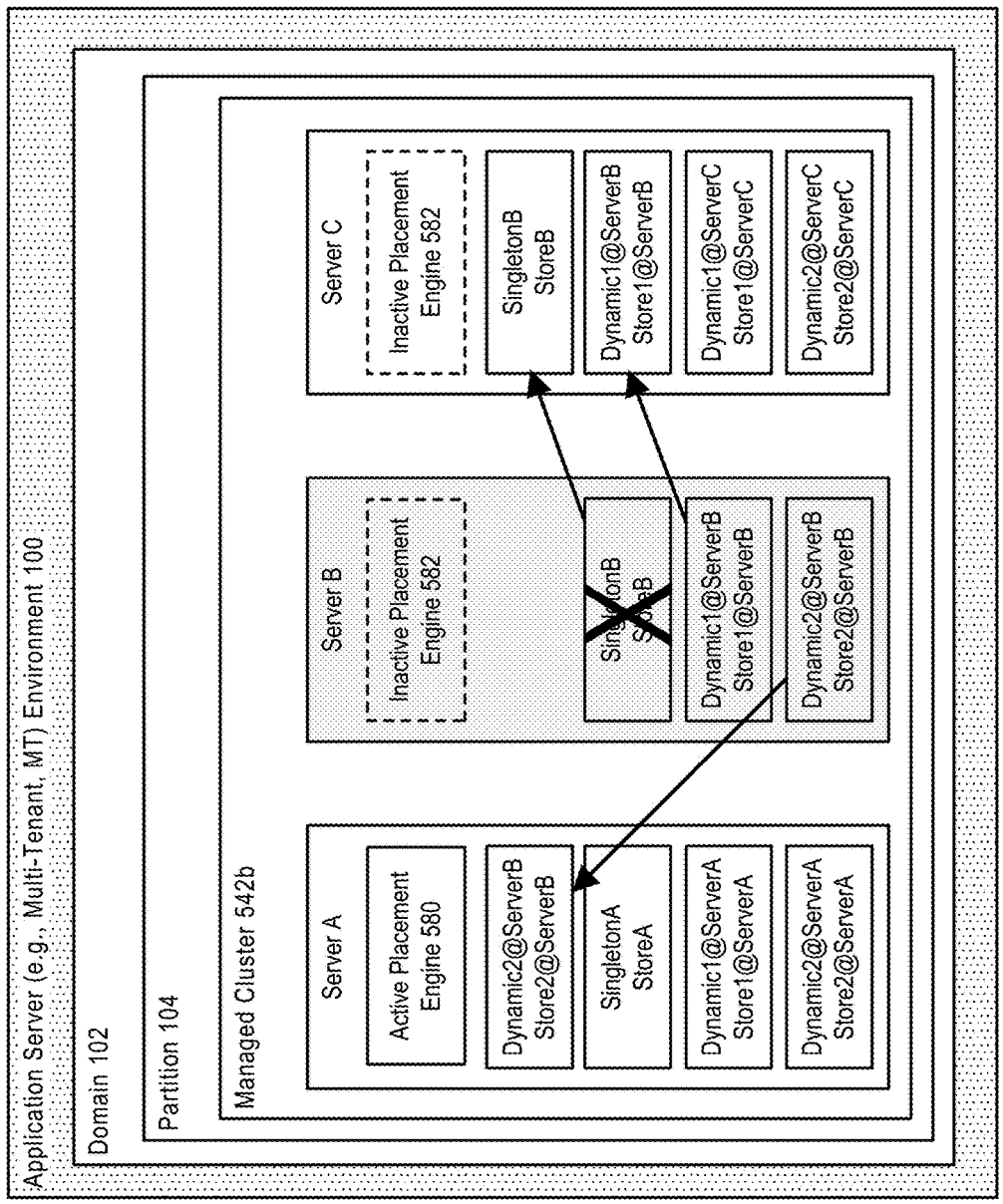
FIG. 8 illustrates dynamic clustered JMS in a multi-tenant application server environment comprising a placement engine for migrating JMS artifacts when responding to a server failure, in accordance with an embodiment.

FIG. 8 illustrates an example of a placement engine responding to a server failure, in accordance with an embodiment. The cluster 542*b* resembles the grown cluster of FIG. 7, including three servers, ServerA, ServerB and ServerC. ServerA hosts singleton store instance SingletonA and distributed store instances Dynamic1@ServerA and Dynamic2@ServerA, ServerB hosts singleton store instance SingletonB and distributed store instances Dynamic1@ServerB and Dynamic2@ServerB and ServerC hosts distributed store instances Dynamic1@ServerC and Dynamic2@ServerC. In response to ServerB crashing, the placement engine migrates singleton store instance SingletonB and distributed store instance Dynamic1@ServerB to ServerC and migrates distributed store instance Dynamic2@ServerB to ServerA.

An administrator can choose how the placement engine responds to an administrative shutdown. The administrator can decide whether the JMS artifacts are automatically migrated to other servers within the cluster, or if the JMS artifacts remain on the server until the server restarts and is again available.

Figure 9:
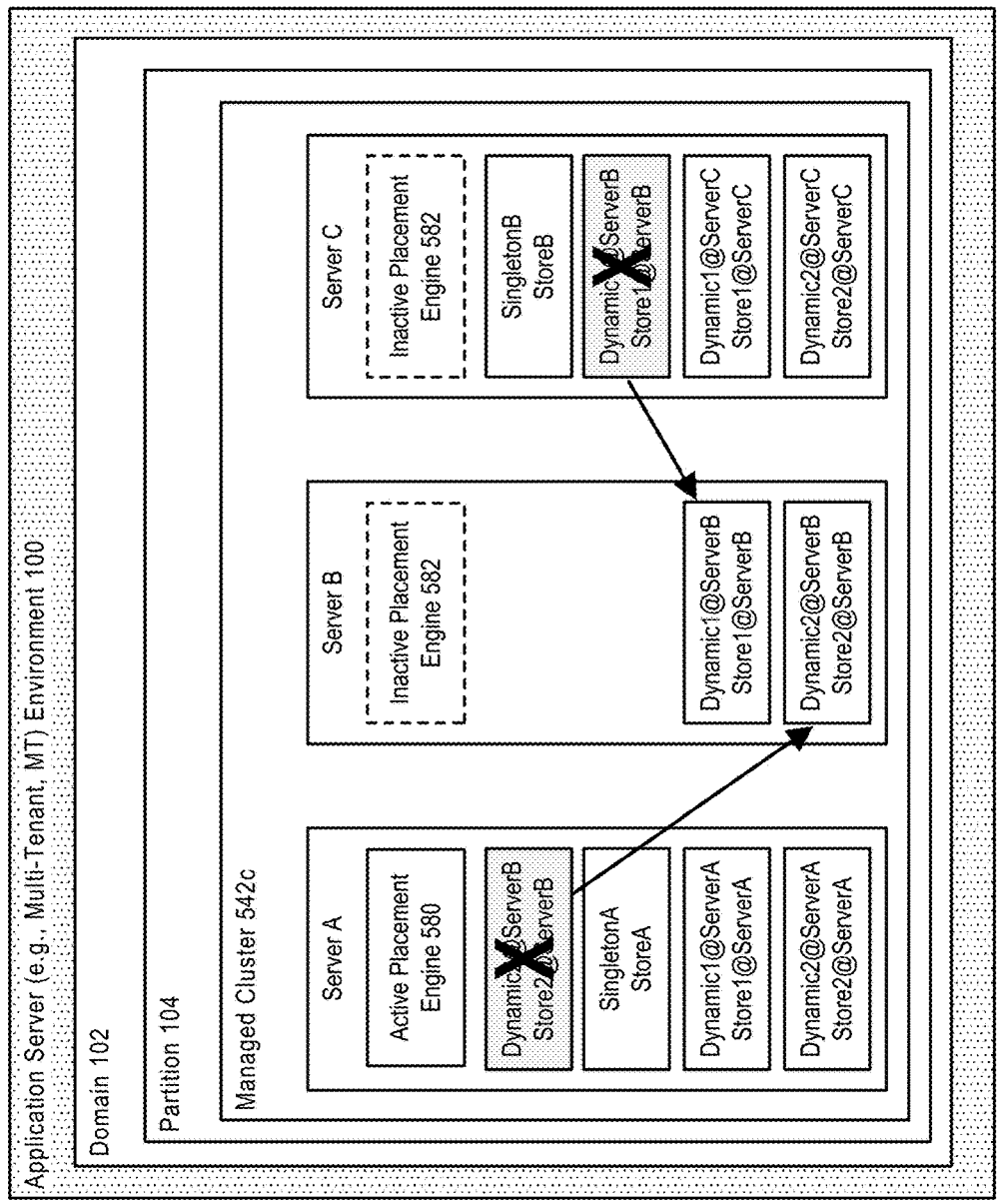
FIG. 9 illustrates dynamic clustered JMS in a multi-tenant application server environment comprising a placement engine for migrating JMS artifacts when responding to a server recovery, in accordance with an embodiment.

FIG. 9 illustrates an example of a placement engine responding to recovery of a crashed server, in accordance with an embodiment. The cluster 542*c* is the same cluster of FIG. 8 after the placement engine has migrated instances from failed ServerB. ServerB is restarted and recovers. The placement engine migrates the distributed store instances Dynamic1@ServerB and Dynamic2@ServerB back to ServerB from ServerC and ServerA, respectively. However, the placement engine does not migrate the singleton instance SingletonB from ServerC, but determines to keep the singleton instance running on ServerC. Such a decision may, for example, be a result of determining appropriate load, or in response to the failure of ServerB, which may be designated as "suspect" for some designated period of time or until some other predefined condition is met.

An administrator can define a stabilization period for a recovered server before which time JMS artifacts are not migrated to the recovered server. Decisions made by the placement engine can be restricted within the stabilization period. In an embodiment, these decisions can be defined or limited by the administrator.

Figure 10B:
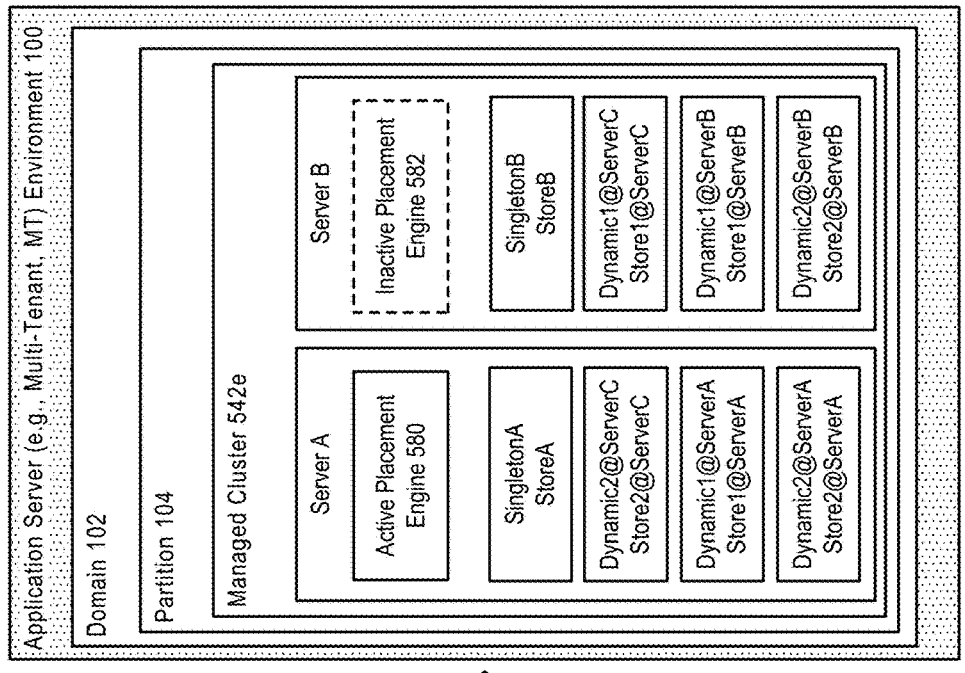
FIGS. 10A and 10B illustrate dynamic clustered JMS in a multi-tenant application server environment comprising a placement engine for migrating JMS artifacts when shrinking a cluster, in accordance with an embodiment.
Figure 10A:
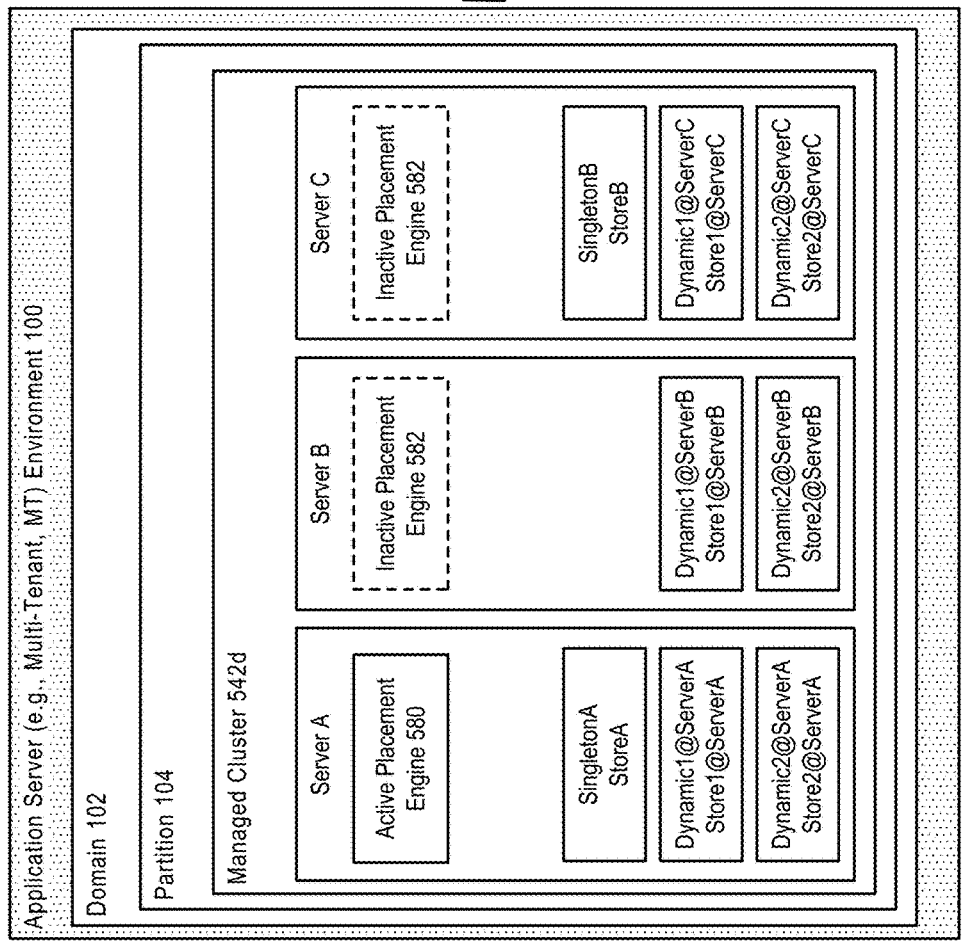

FIGS. 10A and 10B illustrate an example of a placement engine migrating messaging artifacts in order to remove a server from a cluster, in accordance with an embodiment. The cluster 542*d* is the same cluster of FIG. 9 after the placement engine has migrated the distributed store instances Dynamic1@ServerB and Dynamic2@ServerB back to ServerB. As shown, the system determines to shrink the cluster by removing ServerC from the cluster 542*e*. The placement engine therefore determines to migrate the distributed store instance Dynamic2@ServerC to ServerA and migrates singleton store instance SingletonB back to ServerB and migrates distributed store instance Dynamic1@ServerC to ServerB. ServerC is then removed from the cluster.

Quiesce During Cluster Shrink and Failback

In accordance with an embodiment, the system can make a best effort to handle server, partition, deployment, failback, resource group migration, and elasticity lifecycle events to minimize the disruption to applications when members are added, moved or retired. For example, the system can be quiesced by moving new message production to surviving servers and letting consumers try to drain the messages that are already on the servers that are being shutdown, and transitioning non-persistent messages and temporary destinations to other servers.

Multi Tenancy (MT) Requirements

In accordance with an embodiment, dynamic clustered messaging services (e.g., JMS) use HA framework capabilities that in of themselves are capable of use in a partitionable environment (e.g., a WLS-MT environment). "Cluster leasing" is configured at the cluster level and is shared by all partitions.

A core migration framework is capable of use in a partitionable environment (e.g., a WLS-MT environment). When registering a "migratable group" with the core framework, JMS identifies the partition ("null" if Domain level). Callbacks from the framework will have the correct partition component invocation context (CIC) on the thread (with CIC being "null" for Domain scope). The framework will ensure that correct partition CIC is on thread when it logs its status messages, or, if this is not feasible, will at least include the partition name in its log messages.

In order to accommodate a partitionable environment to ensure that any resource group template configuration works the same regardless of whether the resource group is cluster targeted or single server targeted, the use of distribution policy parameter "SINGLETON" is not prevented when no target is specified and the use of the distribution policy parameter "SINGLETON" is supported in non-clustered case at least when scoped to an resource group. Further, the use of distribution policy parameter "SINGLETON" is required for use of "standalone" destination in all resource group templates in a partitionable environment. Further, all migration policies are supported when a single server is targeted by treating them all as "OFF" and restart-in-place functionality is supported when single-server targeted.

Administration of Messaging Service Artifacts

In accordance with an embodiment, an administration console or other user interface for administering or configuring a partitionable environment can facilitate the lifecycle management of the cluster targeted messaging service artifacts (e.g., JMS artifacts) and works in conjunction with existing core migration machinery and clustering technologies.

An administration console or other user interface for administering or configuring a partitionable environment can include targeting screens to support "cluster" as a valid target for SAF agent and message bridges in addition to JMS server and persistent store. Persistent store and messaging bridge configuration pages can support the HA control parameters described above. Scripting tools support management operations including create, read, update and delete (CRUD) operations of cluster targeted JMS artifacts.

JMS features for use in partitionable environments can depend on configuration/management services, for configuration/deployment lifecycle as well as dynamic cluster/server lifecycle management.

In accordance with an embodiment, older clients can interoperate with destinations hosted on cluster targeted SAF Agents and JMS Servers, including the use of UOO and UOW, even when the services are scoped to a Partition.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing a dynamic clustered messaging service in an application server environment, comprising:
   one or more computers having memory and at least one processor, the application server environment executing thereon and associated with a domain for execution of software applications and a plurality of deployable resources,
      wherein the domain and a plurality of partitions are provided at a cluster including a plurality of servers operating within the application server environment;
   wherein each partition of the plurality of partitions provides a subdivision of the domain, and includes a resource group that enables partition-specific information for the deployable resources; and
   wherein the cluster is configured to vary a number of the plurality of servers based on a service load of applications running on the cluster, and failure and restart of the plurality of servers;
   a messaging service for communicating messages between components of the applications running on the cluster, the messaging service including instances of messaging service artifacts running on the plurality of servers; and
   a placement engine residing on each of the plurality of servers, whereupon a determination that a server on which an active placement engine fails, an inactive placement engine on one of the others of the plurality of servers is made active, and
   wherein an active placement engine is configured to migrate one or more of the instances of messaging service artifacts between servers as the number of servers in the cluster and a number of the instances of messaging service artifacts is varied,
   wherein the active placement engine selects a server to which a particular messaging service artifact is migrated based on a distribution policy and a number of messaging service artifacts presently provided on each of the available servers.

2. The system of claim 1, wherein the messaging service is a Java Messaging Service (JMS).

3. The system of claim 1, wherein the active placement engine is further configured to migrate the instances of messaging service artifacts between the plurality of servers based on performance metrics for the plurality of servers.

4. The system of claim 3, wherein the performance metrics for the plurality of servers includes a load of the instances of messaging service artifacts on each of the plurality of servers.

5. The system of claim 1, wherein the cluster is configured to vary the number of servers based on a service load of applications running on the cluster, and
   wherein the number of servers further varies based on failure and restart of one or more servers.

6. The system of claim 1, wherein the active placement engine migrates messaging service artifacts based further on settings of parameters for each of the messaging service artifacts.

7. The system of claim 6, wherein the parameters include distribution policy and migration policy.

8. The system of claim 1, wherein the messaging service artifacts include a file store, and wherein a configuration for the messaging service is provided within the file store.

9. A method for providing a dynamic clustered messaging service in an application server environment, comprising:
   providing, at one or more computers having memory and at least one processor, the application server environment executing thereon and associated with a domain for execution of software applications and a plurality of deployable resources,
      wherein the domain and a plurality of partitions are provided at a cluster including a plurality of servers operating within the application server environment;
   wherein each partition of the plurality of partitions provides a subdivision of the domain, and includes a resource group that enables partition-specific information for the deployable resources; and
   wherein the cluster is configured to vary a number of the plurality of servers based on a service load of applications running on the cluster, and failure and restart of the plurality of servers;
   providing a messaging service for communicating messages between components of the applications running on the cluster, the messaging service including instances of messaging service artifacts running on the plurality of servers;
   providing a placement engine residing on each of the plurality of servers, whereupon a determination that a server on which an active placement engine fails, an inactive placement engine on one of the others of the plurality of servers is made active, and migrating, via an active placement engine, one or more of the instances of messaging service artifacts between servers as the number of servers in the cluster and a number of the instances of messaging service artifacts is varied, wherein the active placement engine selects a server to which a particular messaging service artifact is migrated based on a distribution policy and a number of messaging service artifacts presently provided on each of the available servers.

10. The method of claim 9, wherein the messaging service is a Java Messaging Service (JMS).

11. The method of claim 9, further comprising migrating the instances of messaging service artifacts between the plurality of servers based on performance metrics for the plurality of servers.

12. The method of claim 11, wherein the performance metrics for the plurality of servers includes a load of the instances of messaging service artifacts on each of the plurality of servers.

13. The method of claim 9, wherein the cluster is configured to vary the number of servers based on a service load of applications running on the cluster, and wherein the number of servers further varies based on failure and restart of one or more servers.

14. The method of claim 9, further comprising migrating messaging service artifacts based further on settings of parameters for each of the messaging service artifacts.

15. The method of claim 14, wherein the parameters include distribution policy and migration policy.

16. The method of claim 9, wherein the messaging service artifacts include a file store, and wherein a configuration for the messaging service is provided within the file store.

17. A non-transitory computer readable storage medium, including instructions stored thereon which when read and executed by one or more computers cause the one or more computers to perform the steps comprising:

providing, at one or more computers having memory and at least one processor, the application server environment executing thereon and associated with a domain for execution of software applications and a plurality of deployable resources, wherein the domain and a plurality of partitions are provided at a cluster including a plurality of servers operating within the application server environment;

wherein each partition of the plurality of partitions provides a subdivision of the domain, and includes a resource group that enables partition-specific information for the deployable resources; and wherein the cluster is configured to vary a number of the plurality of servers based on a service load of applications running on the cluster, and failure and restart of the plurality of servers;

providing a messaging service for communicating messages between components of the applications running on the cluster, the messaging service including instances of messaging service artifacts running on the plurality of servers;

providing a placement engine residing on each of the plurality of servers, whereupon a determination that a server on which an active placement engine fails, an inactive placement engine on one of the others of the plurality of servers is made active, and migrating, via an active placement engine, one or more of the instances of messaging service artifacts between servers as the number of servers in the cluster and a number of the instances of messaging service artifacts is varied, wherein the active placement engine selects a server to which a particular messaging service artifact is migrated based on a distribution policy and a number of messaging service artifacts presently provided on each of the available servers.

18. The system of claim 1, wherein the distribution policy includes a set of criteria including at least one of: whether a preferred server from the available servers is identified for the messaging service artifact, a weight of the messaging service artifact, and a success rate of placing other messaging service artifacts on each of the available servers for a period of time preceding migration.

19. The method of claim 9, wherein the distribution policy includes a set of criteria including at least one of: whether a preferred server from the available servers is identified for the messaging service artifact, a weight of the messaging service artifact, and a success rate of placing other messaging service artifacts on each of the available servers for a period of time preceding migration.

* * * * *